United States Patent Office 2,799,961
Patented July 23, 1957

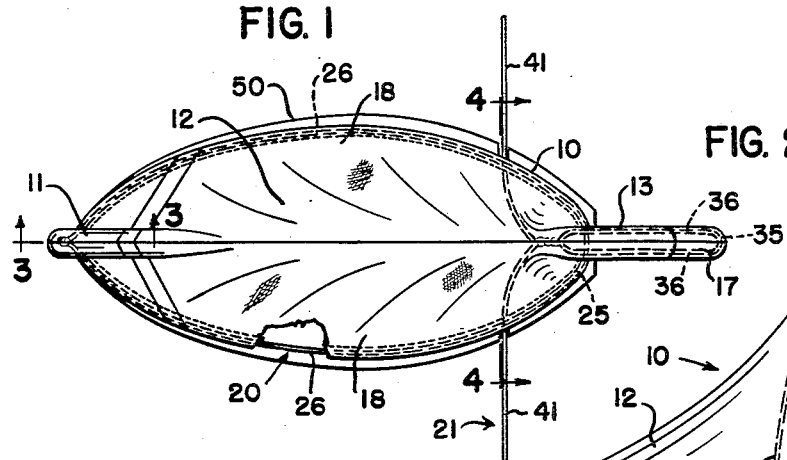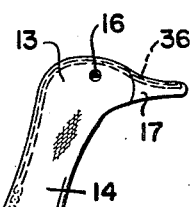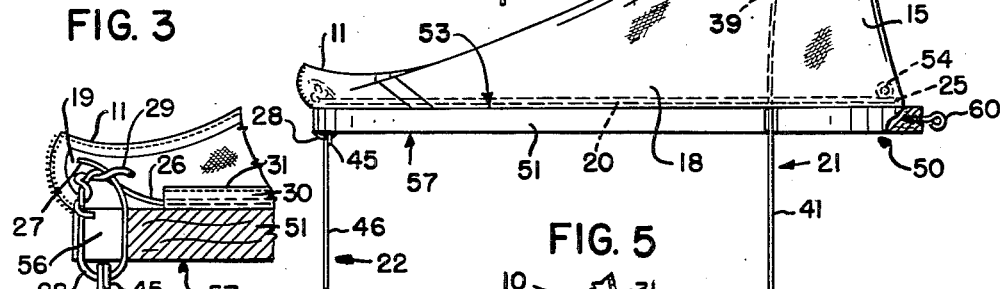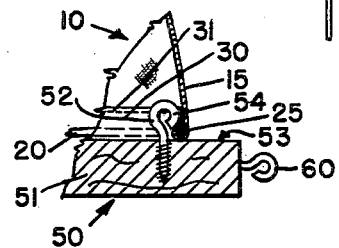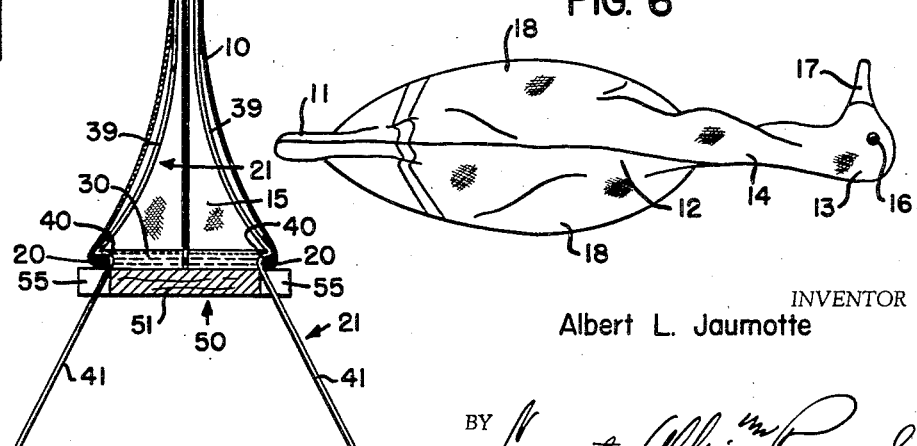

2,799,961

BIRD DECOYS

Albert L. Jaumotte, Choteau, Mont.

Application January 20, 1955, Serial No. 483,108

12 Claims. (Cl. 43—3)

This invention relates to decoys employed in hunting and more specifically to bird decoys.

An important object of the invention is to provide a collapsible decoy in which a flexible or pliable covering and resilient frame members for supporting the covering, and which may also be collapsed, form a small, compact, and particularly flat parcel, when collapsed, for transportation, by the hunter or otherwise, and for storage and the like.

Another important object is to provide a decoy which may be employed on land or water, since portions of the resilient members provide means for insertion into the ground or for insertion into a float.

Still another important object is to provide a collapsible decoy which includes but three resilient members, preferably formed of three lengths of wire, bent to shape, whereby the decoy is of particularly light weight, since the flexible covering which completes the land-positioned decoy, may be of fabric such as canvas. If the decoy is to be employed on water, a suitable float, as a thin board, may be provided as an addition, but the entire weight of the decoy, including the float, need not exceed three pounds.

Additionally, an important object is to provide a collapsible decoy which is easily and quickly set up or collapsed, yet is sturdy when set up, will not be apt to collapse accidentally and contains no parts which are likely to become separated from others and mislaid or lost.

Yet another important object is to provide a collapsible decoy containing but few parts, none of which are complicated, and the parts being so constructed and arranged that the decoy may be readily set up or collapsed without the need of resorting to complicated instructions.

Another important object is to provide a collapsible decoy including members some of which function in one way when the decoy is employed on land and function differently when the decoy is floating.

A further important object is to provide a decoy which includes frame or skeleton members which are not permanently attached to a float so that a float may be dispensed with if the decoy is to be employed on land. This materially reduces the weight of the decoy for transportation by the hunter.

Other objects and advantages of the invention will be apparent during the course of the following detailed description of the invention, taken in connection with the accompanying drawing, forming a portion of this disclosure, and in which drawing:

Fig. 1 is a top plan of the decoy with a portion broken away in order to reveal structure beneath.

Fig. 2 is a side elevation of the decoy.

Fig. 3 is an enlarged fragmentary vertical longitudinal sectional view taken substantially upon the line 3—3 of Fig. 1.

Fig. 4 is a transverse section taken substantially on the line 4—4 of Fig. 1.

Fig. 5 is an enlarged fragmentary vertical longitudinal section of the forward end portion opposite that shown in Fig. 3.

Fig. 6 is a top plan of the decoy as collapsed.

In the drawing wherein for the purpose of illustration is shown a preferred embodiment of the invention and wherein similar reference characters designate corresponding parts throughout the several views, the collapsible decoy is shown to include a flexible or pliable covering 10 which is collapsible and is preferably made of canvas, suitably fashioned to simulate a bird. In the example shown, the simulation is that of a snow goose and may be formed from two canvas sections sewn together along the tail 11, back 12, head 13, neck 14 and breast 15 of the simulation. I prefer to provide eye simulations 16 and beak simulation 17, as well as any desirable colorations of primaries simulations, etc., such as by the use of paint. In fact, I have found the use of paint desirable since the paint impregnates and, when it hardens, stiffens the canvas at the beak 17. The covering 10 is, of course, open at its lower end and provides a compartment for frame members 20 and 21.

In addition the collapsible decoy includes first and second resilient frame members 20 and 21 and a support member 22, which may be of stout but somewhat resilient wire, formed to shape, as by bending.

The first member 20 may be termed the rim frame member, provides means to support the covering 10 extended longitudinally and transversely and is generally curved to form a bight 25 midway the ends of the wire, which bight is positioned forwardly, at the breast 15, two arms 26 extending rearwardly from the bight 25 and more or less curved along the sides 18 and to the tail 11, where one terminal of the wire is, as shown in Fig. 3, turned slightly upwardly, as at 27, and the end portion inwardly of the turned upwardly terminal is then fashioned into a downwardly-extending third portion, loop or eye 28 and the other terminal turned slightly upwardly, as at 29, then wound around the upper end of the loop, with both terminals providing, in addition to the loop 28, an upwardly-extending portion which fits into the tail-forming pocket 19 of the covering 10.

Means for securing the frame member 20 to the covering 10 may be provided by turning the lower edge portions of the covering into a hem 30 and stitching, as at 31, to enclose substantially all of the member 10 except the depending loop 28.

As for the second frame member 21, this may be termed the head and neck forming and anchoring member forming means for supporting the covering 10 extended upright, and the mid portion of the wire forming the member 21 may be fashioned, as by bending, into a narrow bight 35, shown in Fig. 4, and two arms 36, shown in dotted lines in Figs. 1 and 2, which are inserted into the pocket beneath the beak and aid to support the same, whereupon the wire is continued from the arms 36 into two arching arms 37 to support the head 13 The arms 37 preferably continue to a location at the back of the neck 14 whereupon they are twisted together, substantially as at 38, and then separated to form elongated diverging arms 39, extending along the back 12, whereby the member 21 is bifurcated, and at their lower ends are provided with hooks 40 by fashioning the wire into double bights, as may be seen in Fig. 4, for engagement with the hem 30 and exerting pressure upon the arms 26 of the member 20 within the hem, since the arms 39 may be resiliently bowed, also as may be seen in Fig. 4. From the hooks 40, the wire continues to its free ends as dual function legs 41 which are adapted either for insertion into the ground or for resiliently bearing against a wall of recesses 55 in the float 50 to be subsequently described so that the covering 10 and collapsible members 20 and 21 may be detachably retained in proper positions upon the float, as will be more fully described later.

The support member 22 is formed into an eye portion 45 through which the loop 28 extends and a depending free end portion 46. The member 22 is adapted to support the tail end of the covering 10 and the free end portion 46 may be driven into the ground. However, the eye portion 45 has another function as will be subsequently explained in connection with the float 50.

This float 50 may be a short length of plank, such as of any suitable wood to provide a support body 51 for the decoy when used in water. I have found a three-quarter inch thick float of light-weight wood satisfactory and its edge may be shaped to the form of the lower edge of the decoy, i. e., follow the contour of the member 20.

As shown in Fig. 5, at its forward portion, the support body 51 is preferably provided with means to retain the extreme forward end of bight 25 of member 20 in place. This means may be a projection 52 extending upwardly from the upper face 53 of the body 51 adjacent its forward end, with the projection having a beak 54 to engage over the hem 30 and bear against the bight 25 of the frame member 20. This prevents rearward travel of the covering 10 with respect to the float 50.

Rearwardly of the projection 52, but still in the forward part of the body 51, are two recesses or slots 55 extending into the body 51 from the edge thereof. These recesses 55 are adapted to contain portions of the legs 41 just below the hooks 40, with the legs bearing resiliently against the walls of the recesses.

At its extreme rearward end, the float body 51 has a narrow recess or slot 56 adapted to accommodate portions of the loop 28 as in Fig. 3, with the loop resiliently bearing against a wall of the recess. The eye portion 45 contacts the bottom face 57 of the float and prevents accidental sliding of the loop 28 and consequently, the rear end parts of the member 20, upwardly, which would be very undesirable.

I may provide means at a suitable part of the float body to attach a line (not shown) to contain an anchor or be tied to a suitable stake to anchor the decoy. This means may be a screw eye 60.

Fig. 6 illustrates the collapsed decoy. It should be noted that, when collapsed, no part of the member 21 projects outwardly of the covering 10 since the free ends of the legs 41 fit into the tail-forming pocket when the head 13 and neck 14 are disposed as shown. Of course, the member 21 will not become accidently detached, even with the greater portion of the same hanging free, since the bight 35 and arms 36 and 37 are enclosed in the head 13 and neck 14 and frictionally and resiliently held thereby. The free end portion 46 may be folded back to be retained between one of the arms 41 and the covering 10. A compact, easily carried and stored assembly ensues.

In order to set up the decoy for use on the ground, the hooks 40 are positioned to engage the hem 30 and the legs 41 driven into the ground. The free end portion 46 is also driven into the ground. The decoy cannot blow over and will present a good simulation of a bird upon the ground.

For use upon water, the hooks 40 are employed as above but the legs 41 are initially spread to be inserted into the recesses 55, with the beak 54 engaging over the hem 30 so that it bears against the bight 25. By now grasping the free end portion 46 and drawing it rearwardly, the loop 28 may be snapped into the recess 56 and the portion 46 drawn downwardly in order to cause the eye portion to tightly engage the surface 57 at the lower ends of the recess 56. A line may now be attached to the eye 60.

It will be appreciated in Fig. 2 that the diverging arms 39 become bowed slightly when the decoy is erected. This effect is accomplished by hooking the hooks 40 into the hem 30, to bear against the member 20, quite well forwardly. So hooked, the neck 14 will be held well erect.

While it has been stated that the float 50 need not be employed when the decoy is used on land, it is now obvious that, if the hunter has brought with him a supply of floats 50 with the intention of hunting over water but decides to hunt upon land or set up the decoys on land, he may employ the floats as bases when setting up the decoys on land.

Various changes may be made to the form of the invention herein shown and described without departing from the spirit of the invention or scope of the following claims.

What is claimed is:

1. A decoy including an elongated flexible extensible covering simulating, when extended, the body of a vertebrate and providing a downwardly-opening compartment when said covering is extended; means within said compartment to support said covering extended longitudinally and transversely; and collapsible means to support said covering extended upright, the last means being partly within said compartment and extending downwardly and outwardly of said covering to provide anchors for said decoy.

2. A decoy according to claim 1, characterized in that said collapsible means is detachably supported upon the first-named means.

3. A decoy according to claim 1, characterized in that said covering has a lower edge; the first-named means includes an elongated narrow member extending about said edge and secured thereto; and the collapsible means includes a pair of arms of resilient material extending downwardly into said compartment and having hooks formed intermediate their ends detachably mounted upon said elongated narrow member.

4. A decoy including a collapsible covering simulating when extended, the body of a vertebrate and providing a compartment beneath said covering when said covering is extended, said covering having a lower edge; means within said compartment to support said covering extended longitudinally and transversely, including an elongated narrow member forming a loop and extending about said edge; means securing said member to said covering; and collapsible means to support said covering extended upright, including a pair of arms of resilient material extending downwardly into said compartment and having hooks formed intermediate their ends detachably mounted upon and resiliently bearing against said member.

5. A decoy including a pliable covering simulating, when extended, the body of a vertebrate, including the tail thereof, and providing a compartment beneath said covering when said covering is extended, said compartment including a tail pocket; means within said compartment to support said covering extended vertically longitudinally and transversely, and comprising an elongated portion of loop shape, a second portion extending upwardly from said elongated portion and into said pocket and a third portion extending downwardly from said elongated and second portions; means securing said elongated portion to said covering; and means to detachably secure said decoy to the ground comprising a prong carried by said third portion.

6. A decoy including a pliable covering simulating, when extended, the body of a vertebrate, including the tail thereof, and providing a compartment beneath said covering when said covering is extended, said compartment including a tail pocket; means within said compartment to support said covering extended vertically longitudinally and transversely, and comprising an elongated portion of loop shape, a second portion of loop shape extending upwardly from said elongated portion and into said pocket and a third portion extending downwardly from said elongated and second portions; means securing said elongated portion to said covering; and means to detachably secure said decoy to the ground comprising a prong pivotally carried by said third portion.

7. A collapsible decoy simulating a vertebrate, said decoy including a pliable covering providing, when extended, the body of a vertebrate, and a compartment when said covering is extended, said covering having a head pocket and a lower edge, said lower edge defining a loop when said covering is extended; first means within said compartment to support said covering extended longitudinally and transversely comprising a first member of stout wire formed into a loop; means securing said member to said edge; and second means to support said covering extended upwardly, comprising a second member of stout resilient wire formed into a head portion in frictional engagement with the covering at said head pocket, and a pair of resilient arms extending divergently downwardly from said head portion and having means at their lower ends to frictionally bear upon said covering at said first member when said arms are under tension.

8. A collapsible decoy simulating a vertebrate, said decoy including a pliable covering providing, when extended, the body of a vertebrate, and a compartment when said covering is extended, said covering having a head pocket and a lower edge, said lower edge defining a loop when said covering is extended; first means within said compartment to support said covering extended longitudinally and transversely comprising a first member of stout wire formed into a loop; means securing said member to said edge; second means to support said covering extended upwardly, comprising a second member of stout resilient wire formed into a head portion in frictional engagement with the covering at said head pocket, a pair of resilient arms extending divergently downwardly from said head portion and having means at their lower ends to frictionally bear upon said covering at said first member when said arms are under tension, and a pair of legs extending from said pair of arms; and a float mounting said covering and said second means, said float having a pair of openings to receive said legs in frictional engagement with the walls of said openings.

9. A collapsible decoy according to claim 8 characterized in that said float has outer edges and said openings are slots extending inwardly from said edges.

10. A decoy including a covering simulating the body of a vertebrate, and being provided with a lower edge; support means for said covering, including a border member extending about said edge and secured to said covering, said member having a portion formed into a downwardly-extending loop; a member having an eye portion movably extending about said loop, and a manually-movable ground-piercing depending portion extending from the eye portion; and a float for detachable connection with said covering, having an upper face, a lower face, an edge connecting said faces, and a narrow slot extending inwardly from said edge from one face to the other face, said loop being removably disposed in said slot when said lower edge of said covering is disposed upon said upper face, the length of said loop being such that said eye portion will bear against said lower face, when said depending portion is substantially vertical, to detachably retain the portions adjacent thereto of said covering upon said float.

11. A decoy including a covering defining a simulation of a vertebrate body having a lower edge and a downwardly-opening pocket; support means for said covering, including a member having a portion formed into a loop, secured to said covering, extending into said pocket to support the wall thereof, and having a portion extending downwardly and outwardly of said pocket; a member having an eye portion movably extending about said loop, and a manually-movable ground-piercing depending portion extending from the eye portion; and a float for detachable connection with said covering, having an upper face, a lower face, an edge connecting said faces, and a narrow slot extending inwardly from said edge from one face to the other face, said loop being removably disposed in said slot when said edge of said covering is disposed upon said upper face, the length of said loop being such that said eye portion will bear against said lower face, when said depending portion is substantially vertical, to detachably retain the covering portion adjacent thereto to said float.

12. A collapsible decoy simulating a vertebrate, said decoy including a pliable covering providing, when extended, a simulation of the body of a vertebrate, including a tail, said covering also providing, when extended, a compartment open at its bottom when said covering is extended and having a head pocket and a tail pocket; support means for said covering including an elongated member having a support portion extending into said head pocket and in frictional engagement with the walls thereof, a pair of resilient arms connected with said portion and diverging therefrom and in engagement, over a part of their length, with said covering when said covering is extended, and a pair of thin legs extending from said arms below and outwardly of said covering when said covering is extended and adapted to be driven into the ground, the length of said member being such that, when said covering is collapsed and said support portion is within said head pocket, the free ends of said legs may be inserted into said tail pocket, whereby said decoy when collapsed provides a relatively flat structure with said free ends retained and concealed in said pocket.

References Cited in the file of this patent

UNITED STATES PATENTS

| | | |
|---|---|---|
| 812,499 | Johnston | Feb. 13, 1906 |
| 955,203 | Reynolds | Apr. 19, 1910 |
| 1,112,052 | Campbell | Sept. 29, 1914 |
| 1,527,711 | Stallman | Feb. 24, 1925 |
| 2,536,736 | Gazalski | Jan. 2, 1951 |